United States Patent [19]

Kohn

[11] Patent Number: 5,276,847
[45] Date of Patent: Jan. 4, 1994

[54] METHOD FOR LOCKING AND UNLOCKING A COMPUTER ADDRESS

[75] Inventor: Leslie D. Kohn, San Jose, Calif.
[73] Assignee: Intel Corporation, Santa Clara, Calif.
[21] Appl. No.: 912,033
[22] Filed: Jul. 9, 1992

Related U.S. Application Data

[63] Continuation of Ser. No. 480,119, Feb. 14, 1990, abandoned.

[51] Int. Cl.⁵ .................................................. G06F 12/00
[52] U.S. Cl. ......................... 395/425; 364/DIG. 1; 364/246.8; 364/261.6; 364/262.4; 364/263.2; 395/725
[58] Field of Search ................ 395/725, 325, 425, 800

[56] References Cited

U.S. PATENT DOCUMENTS

| | | | |
|---|---|---|---|
| 4,435,766 | 3/1984 | Haber et al. | 395/725 |
| 4,488,217 | 12/1984 | Binder et al. | 395/375 |
| 4,587,609 | 5/1986 | Boudreau et al. | 395/725 |
| 4,663,709 | 5/1987 | Fujiwara et al. | 395/725 |
| 4,665,484 | 5/1987 | Nanba | 395/650 |
| 4,725,946 | 2/1988 | Prange et al. | 375/775 |
| 4,733,352 | 3/1988 | Nakamura et al. | 395/425 |
| 4,858,116 | 8/1989 | Gillett, Jr. et al. | 395/325 |
| 4,937,733 | 6/1990 | Gillett, Jr. et al. | 395/325 |
| 4,941,083 | 7/1990 | Gillett, Jr. et al. | 395/325 |
| 4,949,239 | 8/1990 | Gillett, Jr. et al. | 395/325 |
| 4,975,833 | 12/1990 | Jinzaki | 395/425 |
| 4,979,099 | 12/1990 | Milia et al. | 395/325 |
| 5,027,317 | 6/1991 | Pepera et al. | 395/375 |
| 5,063,504 | 11/1991 | Jordan, Jr. | 395/725 |
| 5,095,421 | 3/1992 | Freund | 395/650 |
| 5,140,685 | 8/1992 | Sipple et al. | 395/425 |
| 5,175,837 | 12/1992 | Arnold et al. | 395/425 |

OTHER PUBLICATIONS

J. Crawford & P. Gelsinger, *Programming the* 80386, pp. 2, 35, 41, 131–136, 142–149, 167, 179, 190–191, 209, 211–213, 245–246, 257, 262–263, 265, 267–268, 411–412, 553–556 (SYBEX Inc. (1987).

Vol. I (Microprocessor) of *Microprocessor and Peripheral Handbook of Intel Corp.*, pp. 4–1 through 4–128 (Oct. 1987).

G. Letwin, *Inside OS/2*, pp. 69–84 (Microsoft Press 1988).

*Primary Examiner*—Michael R. Fleming
*Assistant Examiner*—Ayaz R. Sheikh
*Attorney, Agent, or Firm*—Blakely, Sokoloff, Taylor & Zafman

[57] ABSTRACT

A method for locking and unlocking a computer address is described. A separate instruction for locking is read. A first value is assigned to a flag to indicate that locking has been requested. An instruction that uses the address is executed. The address is locked such that the address can be accessed by the processor and not by any other processor. A separate instruction for unlocking is read. A second value is assigned to a flag to indicate that unlocking has been requested. A load instruction or a store instruction is executed. The address is unlocked such that the address can be accessed by the processor and by at least one other processor.

21 Claims, 15 Drawing Sheets

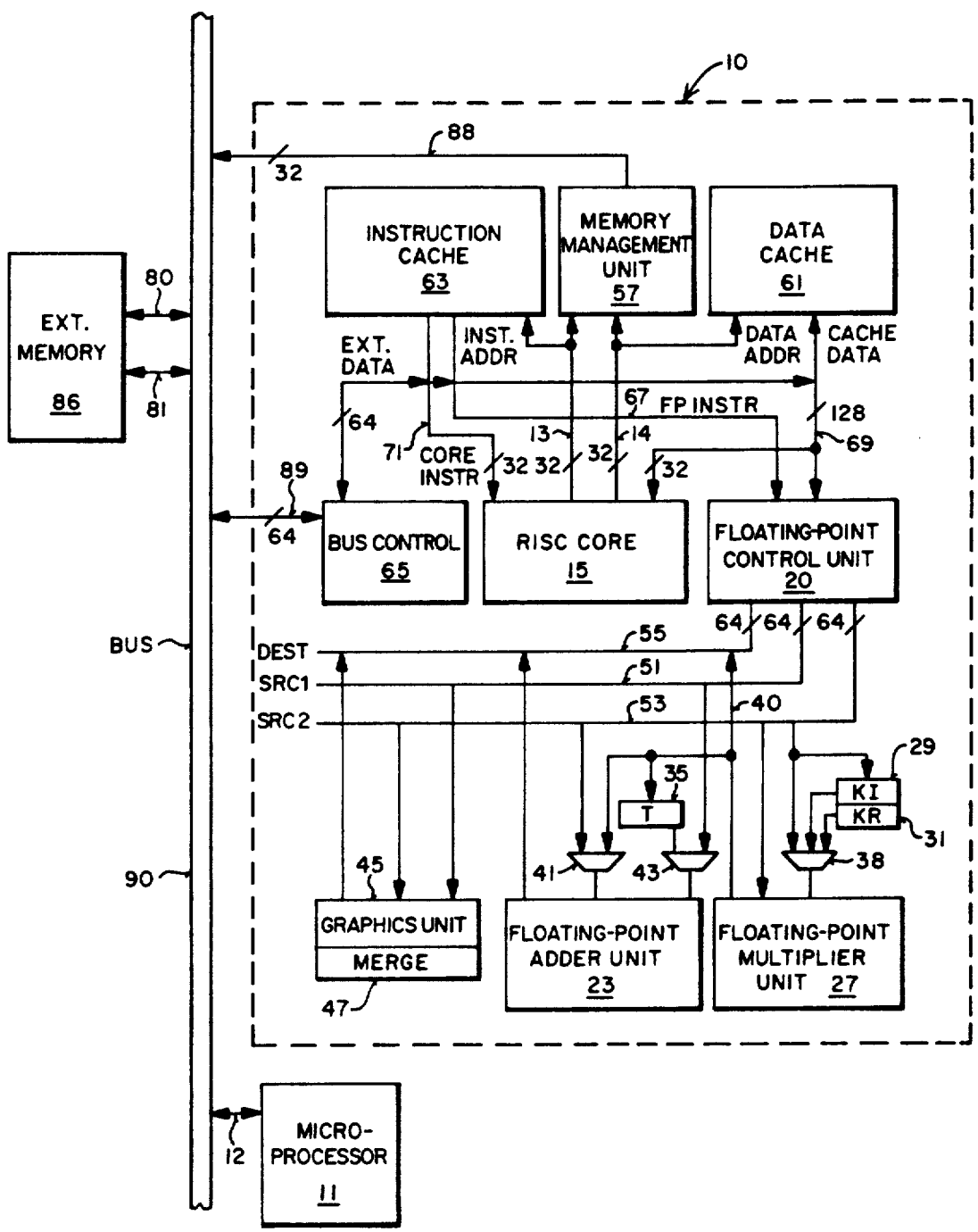
FIG_1

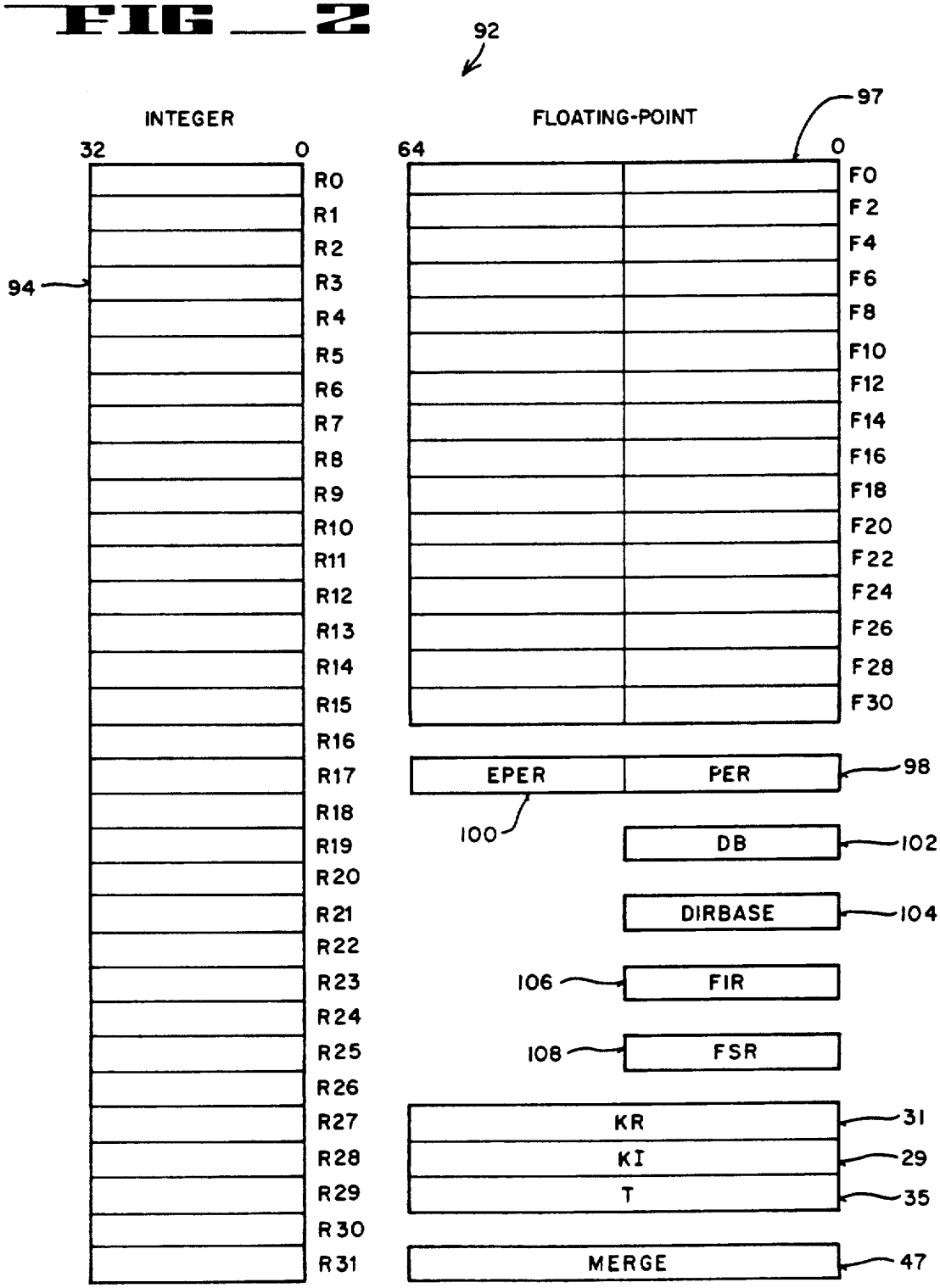
FIG_2

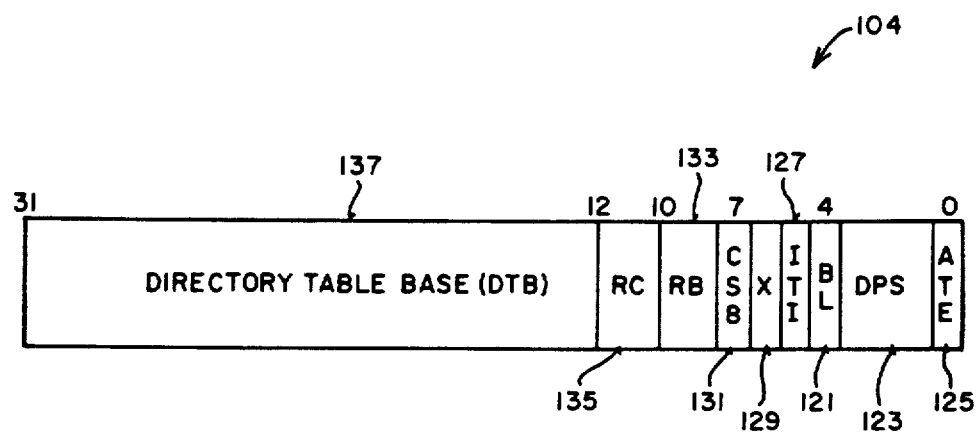
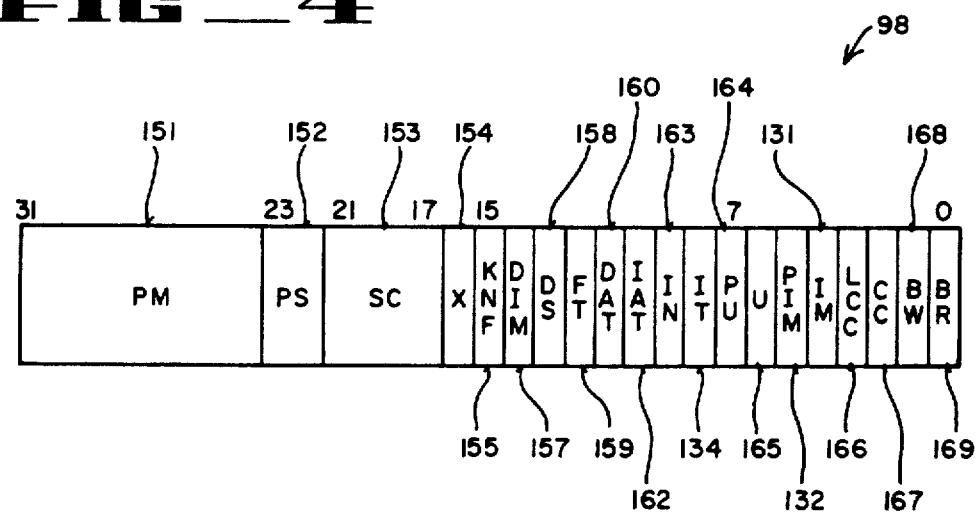
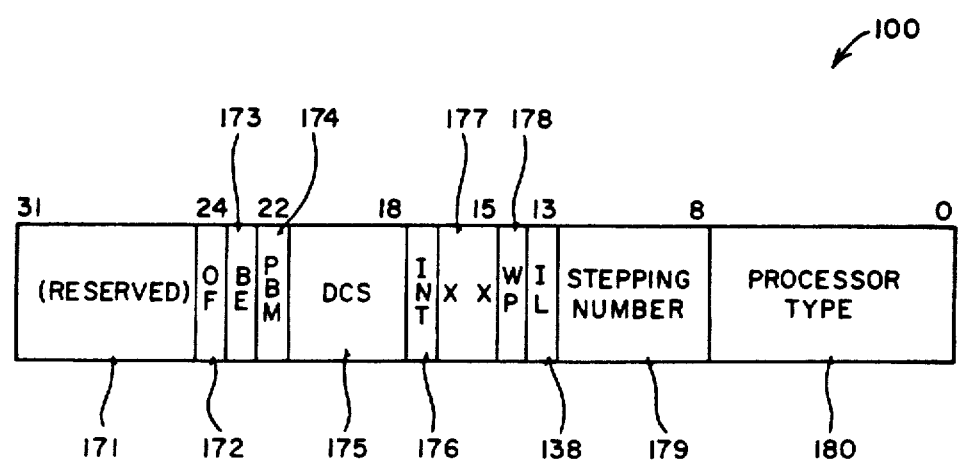

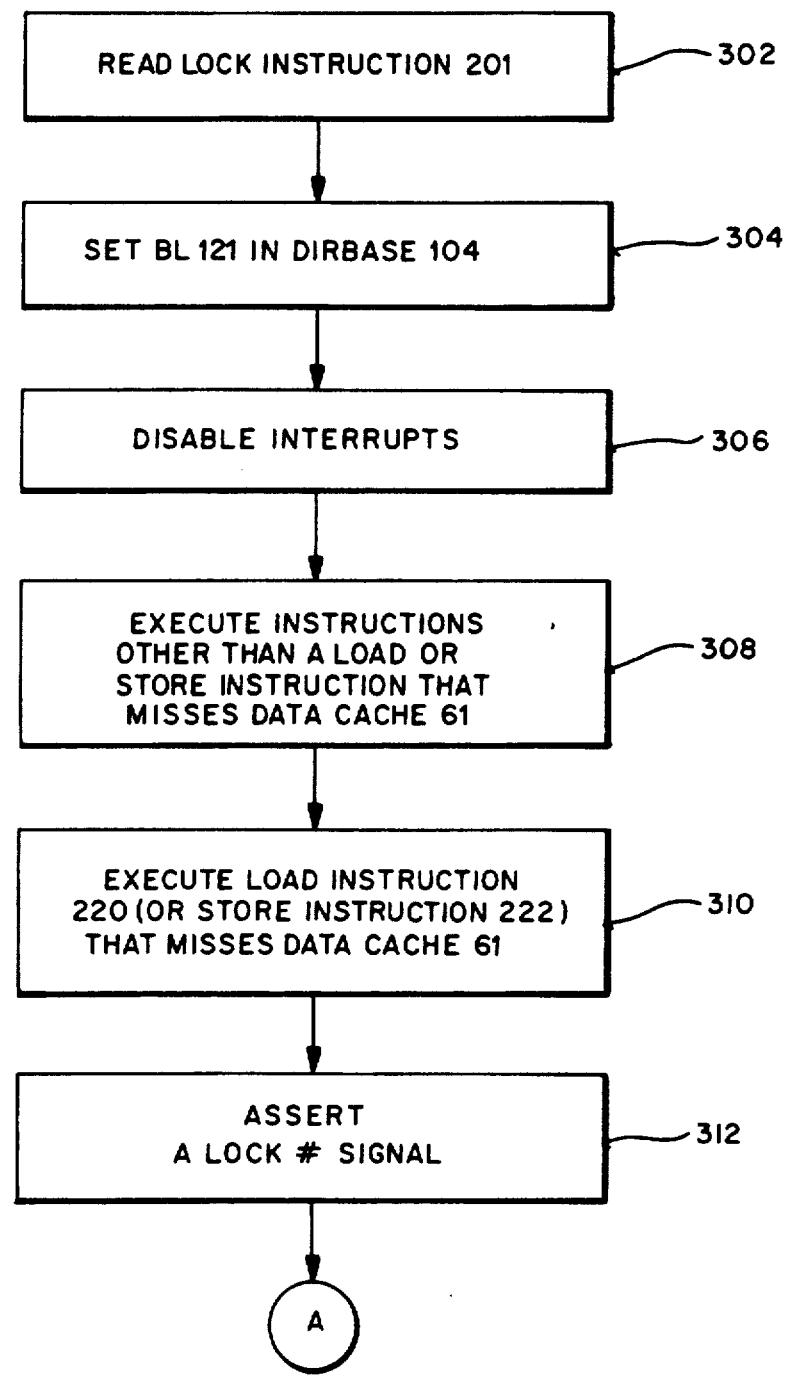

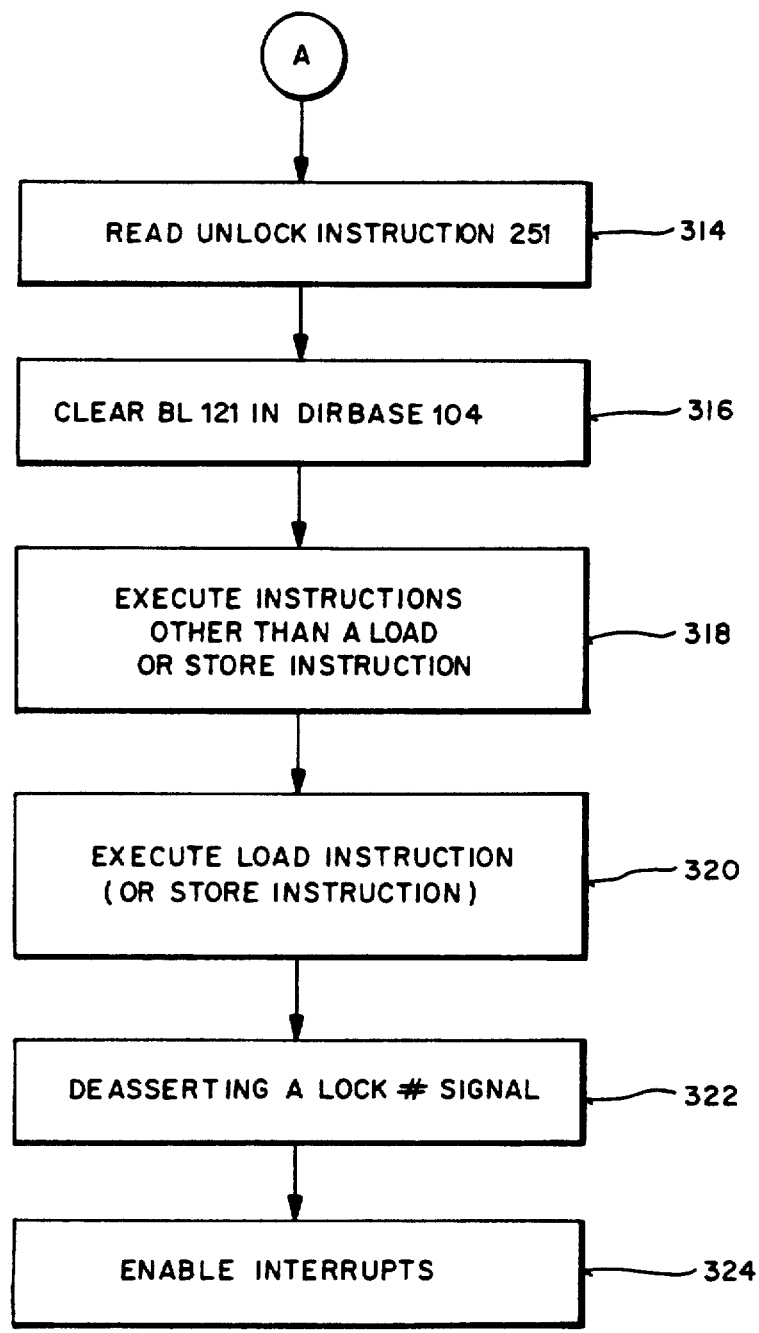

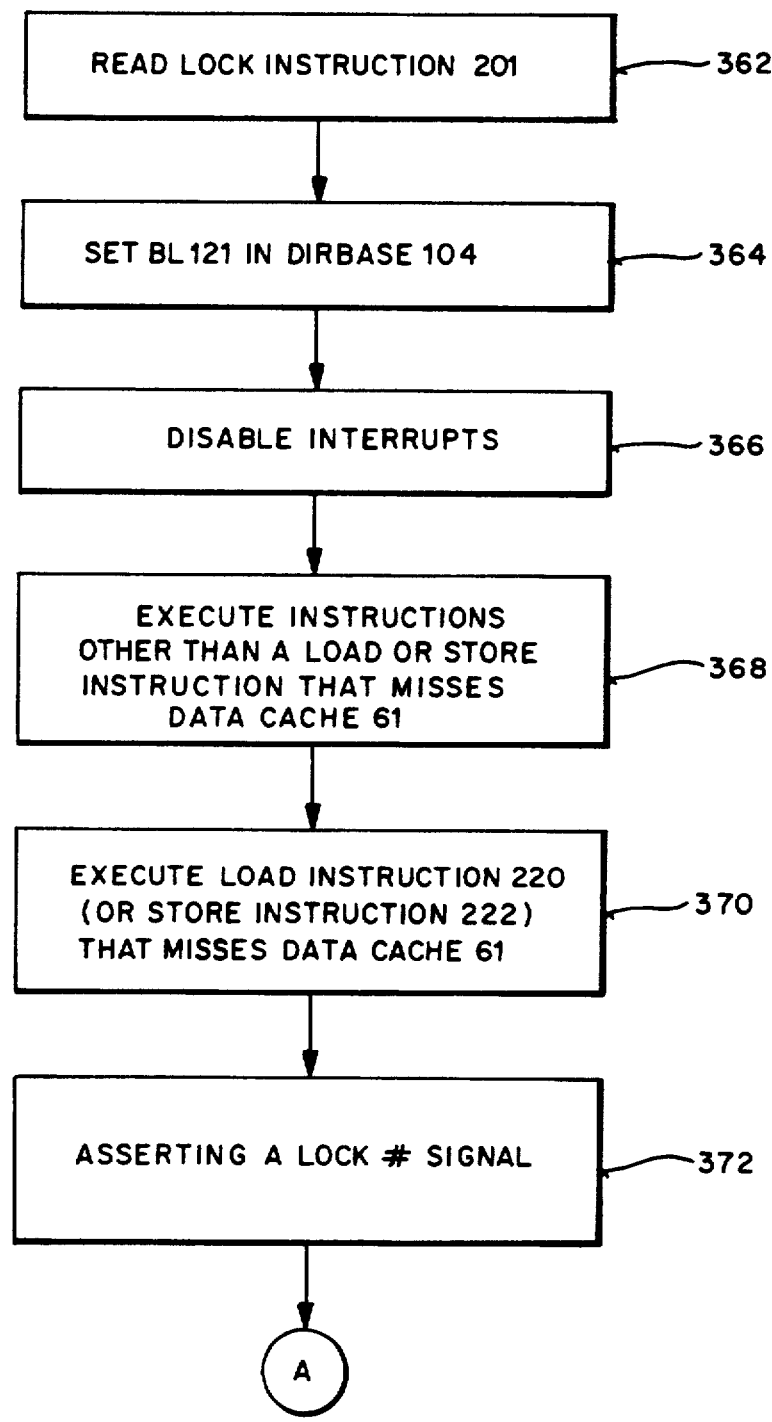
FIG_7A

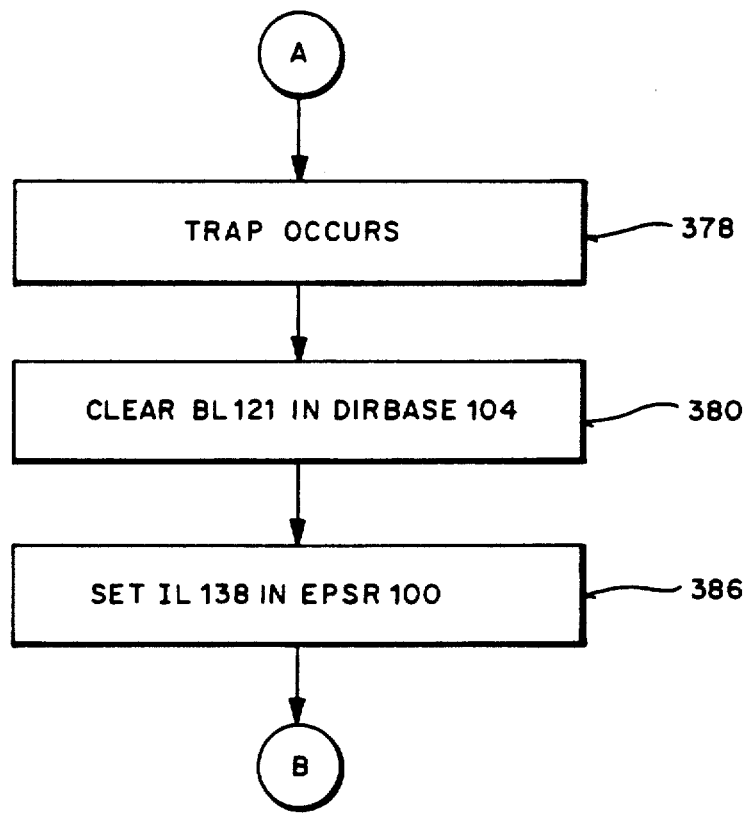

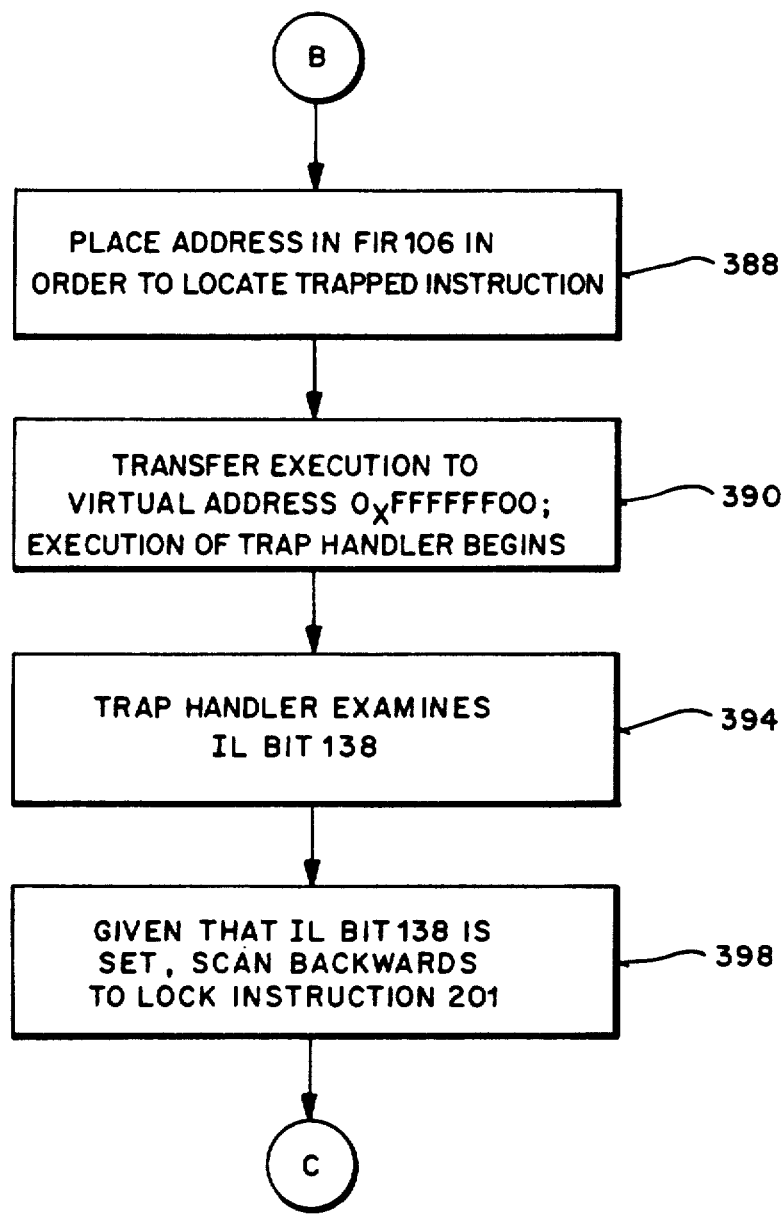
FIG_7C

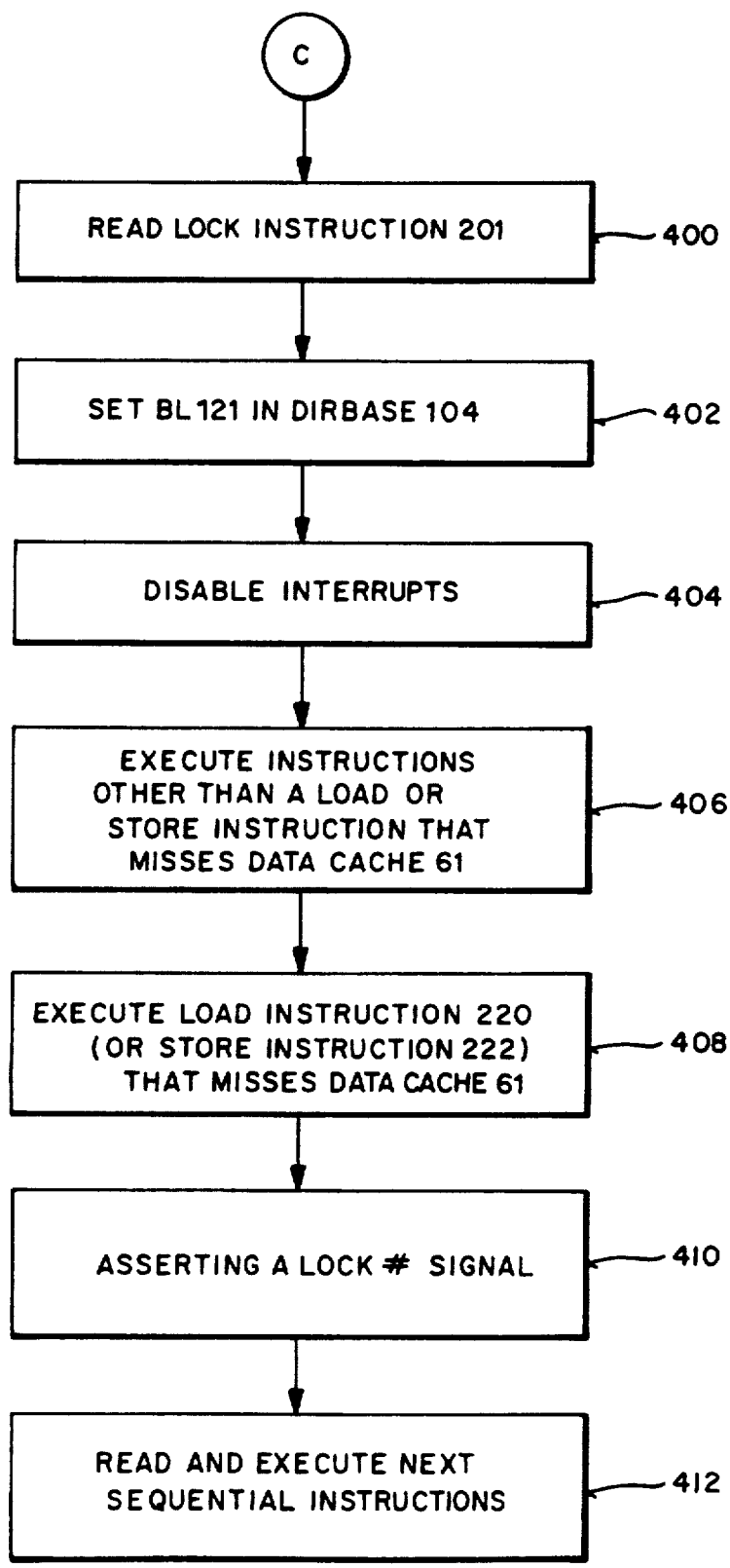

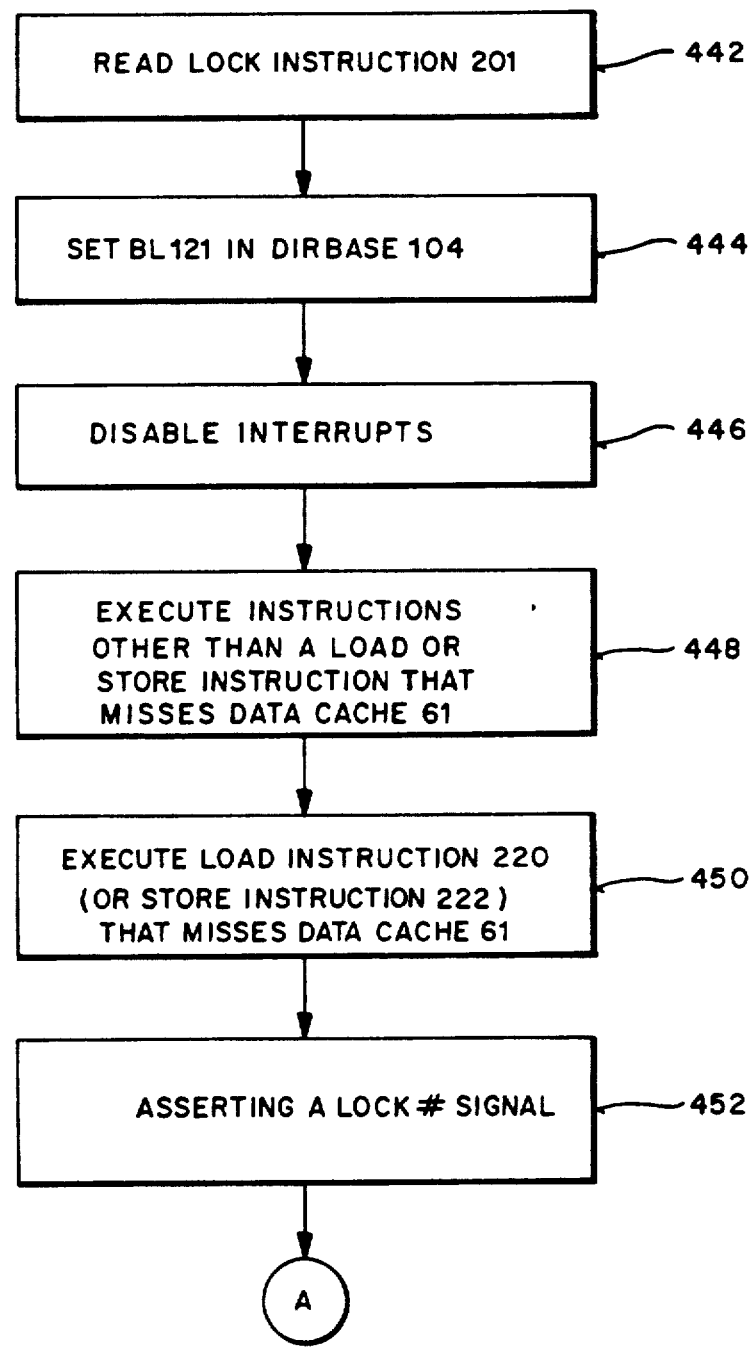
FIG_8A

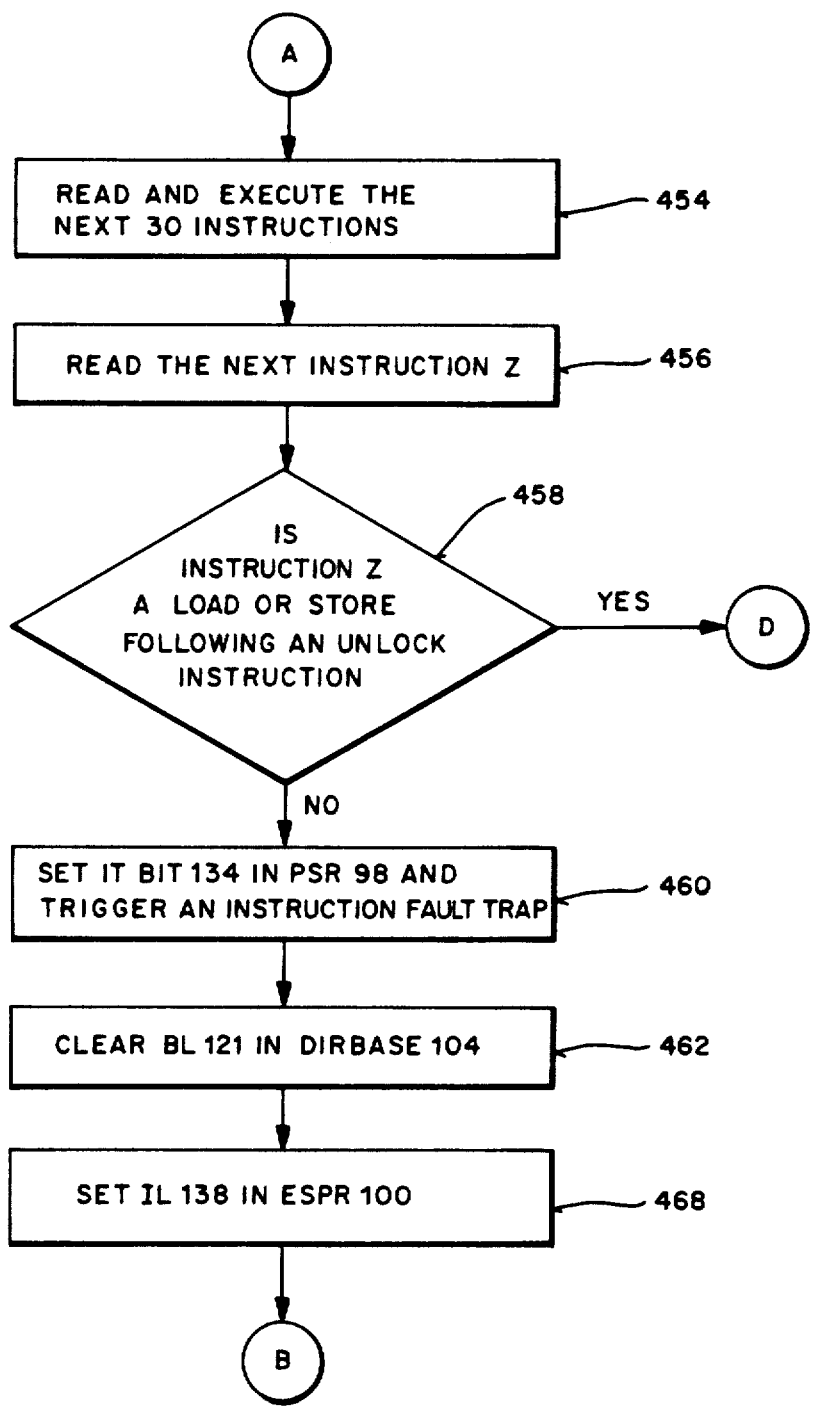

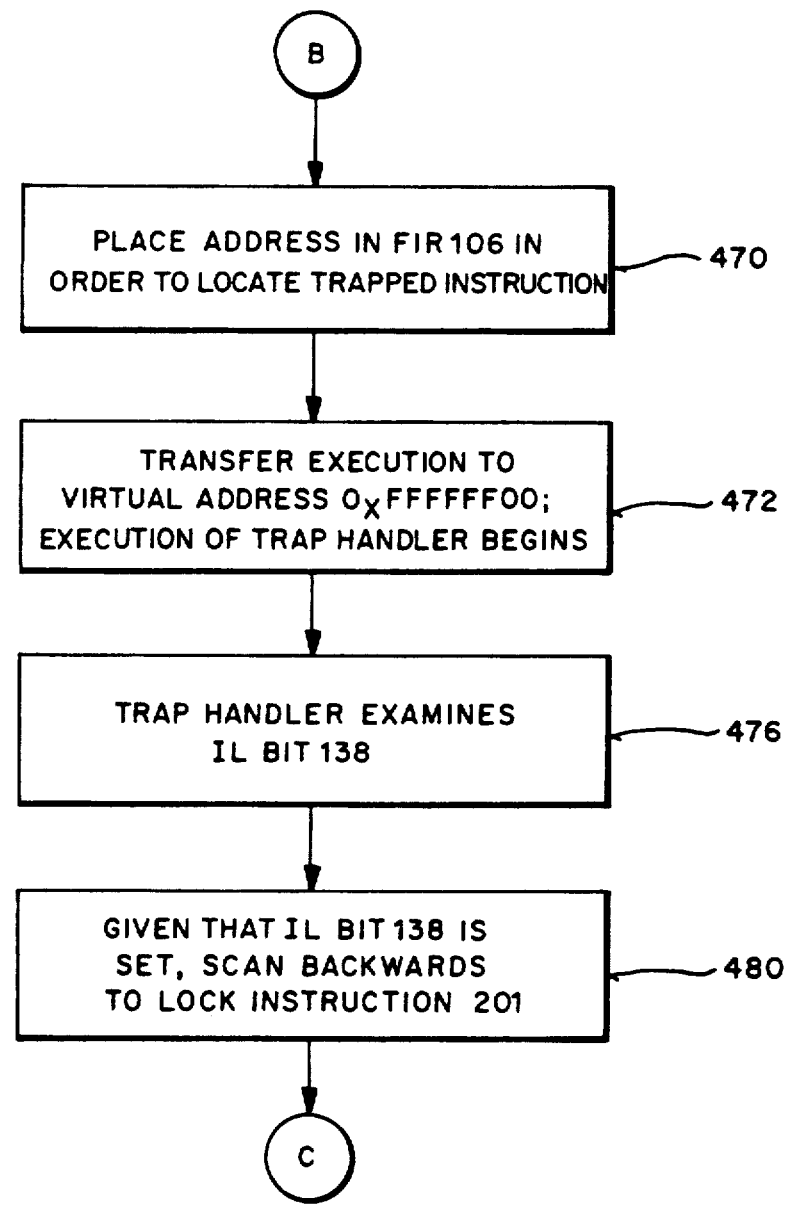

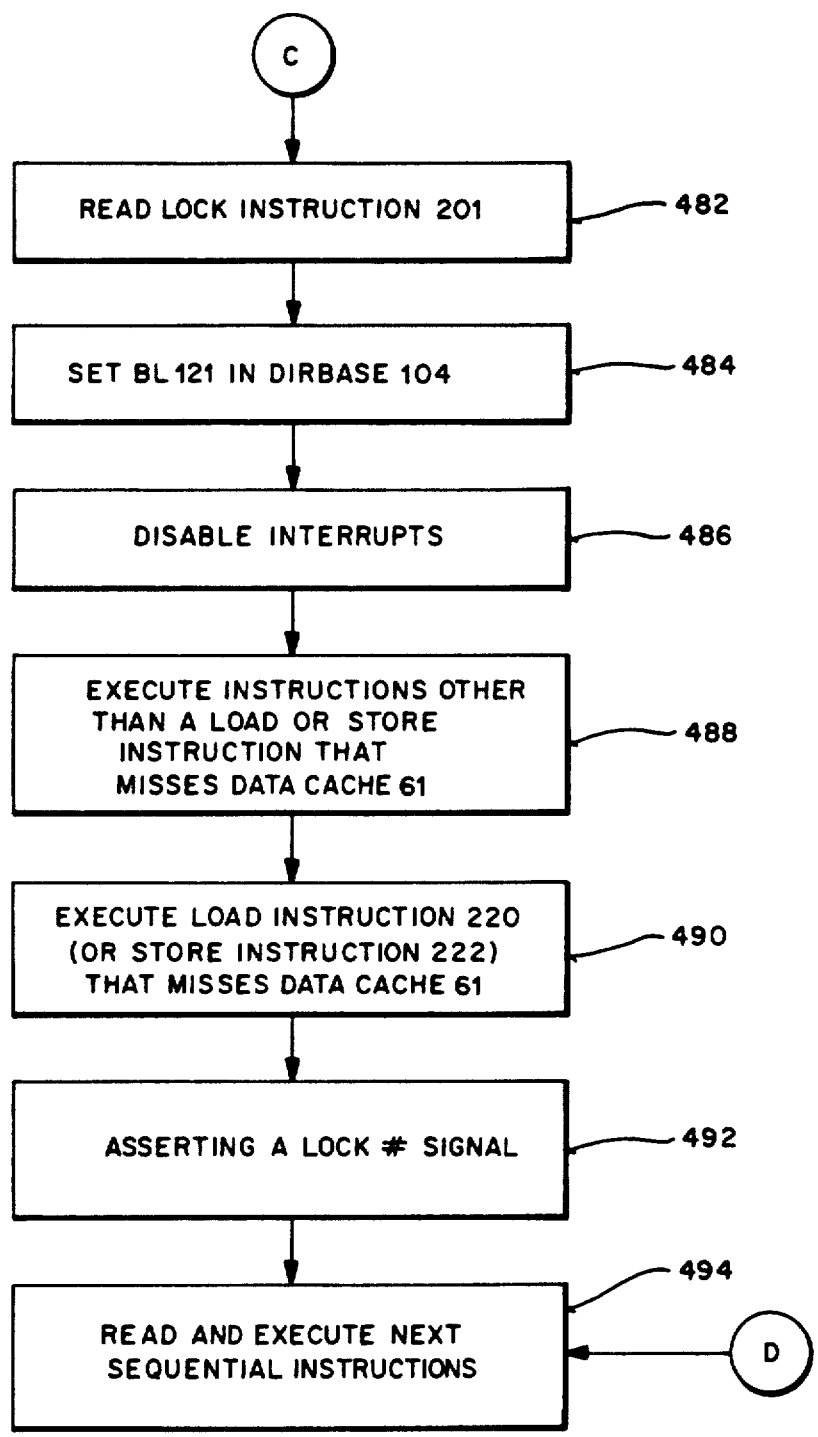

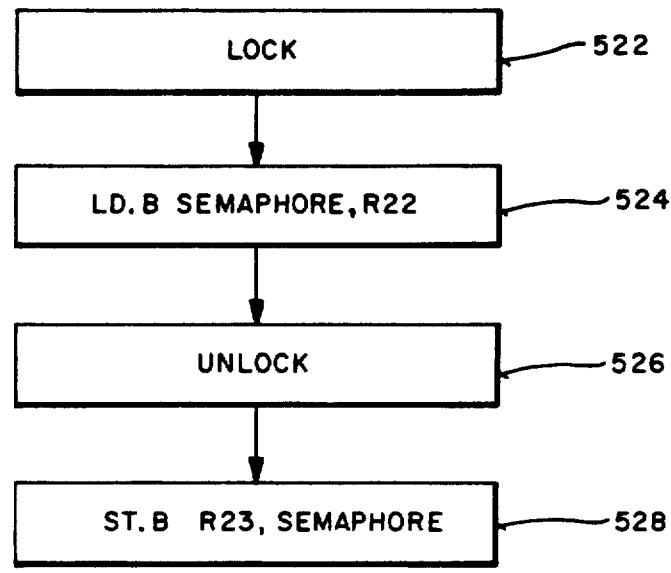
FIG_9
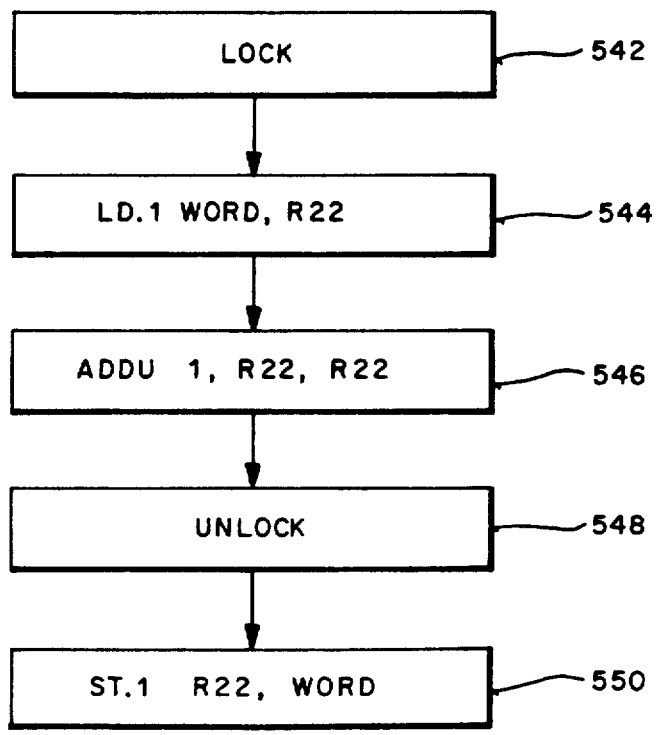
FIG_10

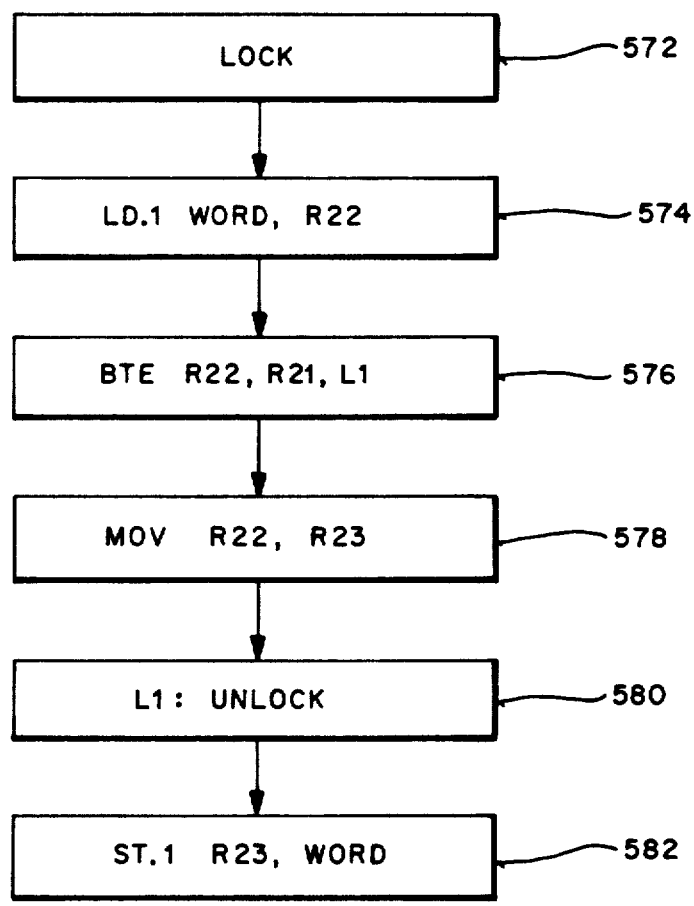
FIG_11

METHOD FOR LOCKING AND UNLOCKING A COMPUTER ADDRESS

This is a continuation of application Ser. No. 07/480,119, filed Feb. 14, 1990 now abandoned.

FIELD OF THE INVENTION

The present invention pertains to the field of computer architecture with respect to the handling of load and store operations in a digital system with multitasking. More particularly, this invention relates to a method for locking and unlocking a computer bus coupled to a processor.

BACKGROUND OF THE INVENTION

One prior computer architecture technique for increasing computer performance uses multitasking. Multitasking is the ability to execute more than one application program or task at a time. Another prior computer architecture technique for increasing computer performance is the use of multiple microprocessors. Multitasking can be used in either a single processor system or a multiprocessor system.

One problem of multitasking systems is the allocation of system resources between tasks. For example, if two processes are requesting a disk, tape, or file, the system should guarantee that both do not attempt to use it at the same time. In other words, mutual exclusion between system resources should be guaranteed. One prior solution to this problem is the use of semaphores. Semaphores are special flags that are accessed and changed in an indivisible operation.

In certain prior systems, a register or a memory byte is used as a semaphore flag. If the semaphore flag is set, this indicates that the resource is busy or in use. If the semaphore flag is clear, this indicates that the resource is available. A processor reads the semaphore flag to determine if the resource is free. If the flag is clear, the processor begins using the resource and sets the semaphore flag. The processor clears the semaphore flag after the processor is done using the resource.

The read/modify/write cycle for the semaphore flag is made indivisible. The read/modify/write cycle is also referred to as a test and set operation. If the read/modify/write cycle of the flag were not indivisible, then two processors could read the same flag, and each could determine that the semaphore flag was free and conclude that the system resource was free. This, of course, would be incorrect. Thus, when the semaphore flag is read, no other process or processor in the system can be allowed to access memory until the read/modify/write cycle is complete. The 80386 microprocessor sold by Intel Corporation of Santa Clara, Calif. is an example of a prior processor using the above-described test and set operation. On the 80386 microprocessor, the semaphore flag is a memory byte. Certain prior Reduced Instruction Set Computer ("RISC") processors also use the above-described test and set operation.

The 80386 microprocessor allocates system resources in connection with multitasking through the use of the LOCK instruction prefix. The use of the LOCK prefix is also referred to as a LOCK exchange. On the 80386 microprocessor, an instruction with a LOCK prefix locks the memory for the duration of the instruction to guarantee that the read/modify/write cycle is indivisible. No other processor in the system can access memory until this instruction is complete. Thus, the requisite indivisibility is met. On the 80386 microprocessor, the LOCK prefix can be used only with the following instructions: Add With Carry ("ADC"), Integer Addition ("ADD"), And ("AND"), Bit Test ("BT"), Bit Test and Set ("BTS"), Bit Test and Reset ("BTR"), Bit Test and Complement ("BTC"), Inclusive Or ("OR"), Subtract With Borrow ("SBB"), Subtract ("SUB"), Exclusive Or ("XOR"), Exchange ("XCHG"), Decrement ("DEC"), Increment ("INC"), Negate ("NEG"), and Not ("NOT"). If a LOCK prefix is used with any instruction not on the preceding list, an invalid opcode exception is raised.

One disadvantage of this prior implementation of the LOCK instruction prefix is that it does not work efficiently. If a semaphore is not free when the semaphore is requested, a loop is entered without end until the semaphore is free. This is referred to as "busy waiting," and the loop is referred to as a "spin loop." Such a spin loop is relatively expensive in terms of time because the loop ties up the central processing unit and memory resources while waiting for the semaphore to free. One prior way to overcome this problem is to redefine the semaphore operators to place a process waiting for a free semaphore into a waiting queue and then call a scheduler to execute a different process while waiting for the semaphore. Another prior way to overcome this problem is to implement a counter and a spin loop.

Another disadvantage of the 80386 implementation with respect to the LOCK instruction prefix is that it only applies to the instructions or operations set forth above, which are each test and set (i.e., read/modify/write) instructions. The 80386 LOCK instruction prefix does not apply to operations more complex than test and set operations, such as compare operations or jump (i.e., branch) operations. Another operation more complex than the test and set operation is a compare and swap operation that uses a linked list. In such a compare and swap operation, there is a new element in the list. Therefore, the pointer in memory must be updated. The pointer is not a flag or semaphore.

Operations more complex than test and set operations are, however, used in multitask and multiprocessor digital systems. Therefore, there exists the problem of system allocation for multitasking when operations more complex than test and set operations are used.

Some prior processors overcome the problem of multitasking system allocation for instructions more complex than test and set operations by creating certain new instructions. One disadvantage of this prior approach is that the end result is a relatively complicated sequence of operations that need to be performed. The sequence of operations is complicated because special instructions are needed for different situations and it is difficult to consider all the situations that could arise. Another disadvantage of this approach is that it leads to additional instructions, which is contrary to the goal of a RISC processor of reducing the instruction set of the processor.

SUMMARY AND OBJECTS OF THE INVENTION

In view of the limitations of known systems and techniques, one of the objectives of the present invention is to provide a mechanism for doing indivisible operations, including test and set operations and operations more complex than test and set operations.

These and other objects of the invention are provided for by a method for locking and unlocking a computer address. A separate instruction for locking is read. A first value is assigned to a flag to indicate that locking has been requested. An instruction that uses the address is executed. The address is locked such that the address can be accessed by the processor and not by any other processor. A separate instruction for unlocking is read. A second value is assigned to a flag to indicate that unlocking has been requested. A load instruction or a store instruction is executed. The address is unlocked such that the address can be accessed by the processor and by at least one other processor.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which:

FIG. 1 is a block diagram of the architecture of a computer processor;

FIG. 2 illustrates certain registers of the processor;

FIG. 3 illustrates a directory base register of the processor;

FIG. 4 illustrates a processor status register of the processor;

FIG. 5 illustrates an extended processor status register of the processor;

FIGS. 6A and 6B set forth the steps for locking and unlocking an address;

FIGS. 7A, 7B, 7C, and 7D set forth steps for locking the address when a trap occurs after a lock instruction and before the load or store operation that follows an unlock instruction;

FIGS. 8A, 8B, 8C, and 8D set forth steps when the processor does not encounter a load or store operation following an unlock instruction by the time the processor has executed 32 instructions following a lock instruction;

FIG. 9 sets forth the steps for a locked "test and set" operation;

FIG. 10 sets forth the steps of a locked "load/arithmetic logic unit/store" operation;

FIG. 11 sets forth the steps for a locked "compare and swap" operation.

DETAILED DESCRIPTION

FIG. 1 sets forth a block diagram of the architecture of a computer processor 10 that implements a preferred embodiment of the present invention. Microprocessor 10 functions as a 32/64-bit IEEE-compatible floating-point processor, a 32-bit reduced instruction set computer ("RISC") integer processor, and a 64-bit three-dimensional graphics processor.

Microprocessor 10 employs a four-stage pipeline. In the Fetch stage of the pipeline, an instruction is read from instruction cache 63 in one clock. In the Decode stage of the pipeline, the instruction is decoded and register file 92 of FIG. 2 is read, if needed, in one clock. In the Execution stage of the pipeline, the instruction is executed. Finally, in the Write-Back stage, the result of the execution is written back to a destination register. For load the instruction, however, the Execution stage is used to calculate the effective address and the Write-Back stage is used to read the data cache 61. For the load instruction, there is a Post Write-Back stage for writing the results to a destination register.

In FIG. 1, RISC core unit 15 is the administrative center for microprocessor 10. Core unit 15 contains integer register file 94 of FIG. 2. Core unit 15 fetches both integer and floating-point instructions. Core unit 15 of FIG. 1 is pipelined and decodes and executes load, store, integer, bit, and control transfer operations.

Data cache 61 is a two-way set associative memory of eight kilobytes, with 32-byte blocks. Data cache 61 provides data caching in byte alignment for read and write operations. Data cache 61 is a write-back cache. Data cache 61 employs a one clock read and a two clock pipelined write.

Instruction cache 63 is a two-way set-associative memory of four kilobytes with 32-byte blocks. Instruction cache 63 supplies a 32-bit integer and a 32-bit floating-point instruction in each clock through a 64-bit wide instruction bus comprised of lines 71 and 67.

Bus control unit 65 provides an interface to external bus 90. External bus 90 is coupled to microprocessor 10 via lines 88 and 89. Lines 89 couple bus control unit 65 to bus 90. Bus 90 is coupled to external memory 86 via address lines 80 and data lines 81. In one embodiment of the present invention, bus 90 is coupled to a second microprocessor 11 via lines 12. In alternative embodiments of the present invention, additional processors could be coupled to bus 90. Bus control unit 65 gets bus cycle requests and specifications from RISC core unit 15. Bus control unit 65 performs data and instruction cache access and also handles cache miss cases, including freeze control and cache line replacement. Bus control unit 65 also performs translation lookaside buffer ("TLB") translation. Bus control unit 65 has a pipelined structure that allows up to three outstanding bus cycles.

Core instruction bus 71 couples RISC core unit 15 with instruction cache 63. Floating-point instruction bus 67 couples floating-point control unit 20 with instruction cache 63. Data bus 69 is coupled to RISC core unit 15, floating-point control unit 20, and data cache 61.

Memory management unit 57 is coupled to (1) RISC core unit 15 via lines 13 and 14, and (2) bus 90 via lines 88. Memory management unit 57 performs the translation of the address from the linear logical address space (i.e., the virtual address space) to the linear physical addresses for both data and instruction access.

Floating-point control unit 20 issues floating-point instructions and operands to floating-point adder unit 23 and floating-point multiplier unit 27. Graphics unit 45 of FIG. 1 has 64-bit integer logic that supports three-dimensional graphics drawing algorithms. Graphics unit 45 contains special purpose MERGE register 47. Buses Src1 51, Src2 53, and Dest 55 are each coupled to graphics unit 45, floating-point adder unit 23, floating-point multiplier unit 27, and floating-point control unit 20. Registers KI 29, KR 31, and T 35 are special-purpose registers used by certain dual-operation floating-point instructions.

FIG. 2 illustrates registers 92 of microprocessor 10. Registers 92 include integer register file 94, floating-point register file 97, and control registers psr 98, epsr 100, db 102, dirbase 104, fir 106, and fsr 108. Registers 92 also include special-purpose registers KR 31, KI 29, T 35, and MERGE register 47.

The control registers psr 98, epsr 100, db 102, dirbase 104, fir 106, and fsr 108 are accessible only by load and store control register instructions. The integer registers 94 and floating-point registers 97 are accessed by arithmetic operations and load and store instructions.

Integer register file 94 has 32 integer registers, each 32 bits wide, referred to as T0 through r31. Floating-point register file 97 has 32 floating-point registers, each 32 bits wide, referred to as f0 through f31, which are used for floating-point computations.

FIG. 3 illustrates the format of directory base register dirbase 104. The directory base register 104 controls address translation, caching, and bus options. Bit BL 121 of directory base register 104 is the bus lock bit. When bus lock bit 121 is set to a logical one, a LOCK# signal is asserted the next bus cycle whose internal bus request is generated after bus lock bit 121 is set to a logical one. The LOCK# signal remains set to a logical one on every subsequent bus cycle as long as bus lock bit 121 remains set to a logical one.

The LOCK# signal is deasserted on the next bus cycle whose internal request is generated after bus lock bit 121 is cleared.

Traps occurring during program execution immediately (1) clear bus lock bit 121, (2) clear the LOCK# signal, and (3) set interlock bit IL 138 in extended processor status register 100, discussed below. In such a case, a trap handler should resume execution at the beginning of the locked sequence.

Lock and unlock instructions, discussed in more detail below, control bus lock bit 121.

Directory base register 104 also includes directory table base DTB bits 137, replacement control bits RC 135, replacement block bits RB 133, code size (8-bit) bit CS8 131, reserved bit 129, instruction cache/TLB invalidate bit ITI 127, dynamic random access memory ("DRAM") page size bits DPS 123, and address translation enable bit ATE 125.

FIG. 4 illustrates the format of processor status register psr 98. Processor status register 98 contains certain state information for the current process. Instruction trap bit IT 134 is a trap flag that is set to a logical one when an instruction fault trap condition occurs.

Bit IM 131 is the interrupt mode bit. Interrupt mode bit 131 enables external interrupts when it is set to a logical one. Interrupt mode bit 131 disables external interrupts when it is cleared to a logical zero.

Bit PIM 132 is the previous interrupt mode bit. Previous interrupt mode bit 132 saves interrupt mode bit 131 on the occurrence of a trap condition. This is because interrupt mode bit 131 can be changed when a trap occurs. Interrupt bit 131 is restored to its corresponding status bit when returning from a trap handler with a branch indirect instruction when a trap flag is set in processor status register 98.

Processor status register 98 also includes pixel mask bits PM 151, pixel size bit PS 152, shift count bit SC 153, reserved bit 154, kill next floating-point instruction bit KNF 155, dual instruction mode bit DIM 157, delayed switch bit DS 158, floating-point trap bit FT 159, data access trap bit DAT 160, instruction access trap bit IAT 162, interrupt bit LCC 163, previous user mode bit PU 164, user mode bit U 165, loop condition code bit LCC 166, condition code bit CC 167, break write bit BW 168, and break read bit BR 169.

FIG. 5 illustrates the format of extended processor status register epsr 100. Extended processor status register 100 contains additional state information for the current process beyond that stored in processor status register 98. IL bit 138 is the interlock bit. Interlock bit 138 is set to a logical one if a trap occurs after a lock instruction but before the load or store following the subsequent unlock instruction. If interlock bit 138 is set to a logical one, this indicates to the trap handler that a locked sequence has been interrupted.

Extended processor status register 100 also includes reserved bits 171, overflow flag bit OF 172, big endian mode bit BE 173, page-table bit mode bit PBM 174, data cache size bit DCS 175, interrupt bit INT 176, reserved bits 177, write-protect mode bit WP 178, stepping number bits 179, and processor type bits 180.

FIGS. 6A and 6B set forth the steps associated with the reading and execution of lock and unlock instructions. The bus lock and unlock instructions allow programs running in either user or supervisor mode to perform read-modify-write sequences in multiprocessor and multithread systems.

FIG. 6A illustrates the sequence of steps for reading and executing a bus lock instruction 201. At step 302, lock instruction 201 is fetched from memory, which could be external memory 86 or instruction cache 63 and decoded.

At step 304, execution of lock instruction 201 begins. At 304, bus lock bit 121 of directory base register 104 is set to a logical one.

At step 306, external interrupts are disabled.

At step 308, operations other than a load or store operation that misses data cache are executed.

At step 310, load instruction 220 is executed and misses data cache 61. By missing data cache 61, the load instruction loads a register with the contents of a location of external memory 86 rather than with the contents of data cache 61. That memory location has an address. In other words, because data cache 61 is missed, bus 90 is therefore accessed.

Alternatively, at step 308 a store instruction 222 is read from external memory 86. At step 310, that store instruction 222 is executed and misses data cache 61, which means that data is stored from a bus internal to microprocessor 10 to a location of external memory 86 via bus 90. That memory location has an address. In other words, data is stored to external memory 86 rather than to data cache 61.

At step 312, a LOCK# signal is sent out onto bus 90. Sending out the LOCK# signal onto bus 90 then causes the memory address referenced by the load instruction 220 (or store instruction 222) that missed data cache 61 to be locked. This means that only one processor—namely, microprocessor 10—can access that address while the lock condition still exists.

By assertion of the LOCK# signal, one locks an address. The address is locked and no other processor can access that address until the bus is unlocked. Because one is locking only the address, another processor in the system, such as microprocessor 11, can run as long as that processor does not access the address that is locked. If the other processor tries to access that address, the system hardware holds up that processor.

In one embodiment of the invention, external hardware (not shown) is coupled to bus 90 of FIG. 1 and, once a LOCK# signal is asserted on bus 90, that external hardware monitors bus 90 and acts to only allow processor 10 (i.e., the processor asserting the LOCK# signal) to access the address locked. Each processor has its own LOCK# signal, and that is how the external hardware knows which processor can access the locked address.

In an alternative embodiment, each processor has its own hardware to monitor bus 90 with respect to the LOCK# signal and access to the locked address. In other words, the external hardware is distributed among the processors coupled to bus 90.

In yet another embodiment of the present invention, the assertion of the LOCK# signal would lock bus 90.

In short, FIG. 6A sets forth the steps of an interlocked sequence. Bit 121 in dirbase 104 is set to a logical one. The next load or store instruction that misses data cache 61 locks the address accessed. Interrupts are disabled until the LOCK# signal is deasserted.

In a preferred embodiment of the present invention, once the LOCK# signal is asserted, one cannot enter another lock cycle. If the microprocessor encounters another lock instruction before unlocking occurs, that instruction is ignored. Thus, the software guarantees that another lock instruction is not executed while the address is locked.

The interlocked sequence must be restartable from lock instruction 201 in case a trap occurs. Simple read-modify-write sequences are automatically restartable. For sequences with more than one store, the software must ensure that no traps occur after the non-reexecutable store. To ensure that no data access fault occurs, the software must first store unmodified values in other store locations. To ensure that no instruction fault occurs, the code that is not restartable should not span a page boundary.

As described below, after a lock instruction, the locking does not occur until the first data access that misses the data cache 61. Therefore software in a multiprocessing system should ensure that the first load instruction after a lock instruction references noncacheable memory—i.e., external memory 86, FIG. 6B sets forth the steps for unlocking an address that has been previously locked. At step 314, an unlock instruction 251 is fetched from external memory 86 or instruction cache 63 and decoded.

At step 316, execution of unlock instruction 251 begins. At step 316, bus lock bit 121 of directory base register 104 is cleared to a logical zero.

At step 318, instructions other than a load instruction or a store instruction are executed.

At step 320, a load instruction 220 is executed. It does not matter whether or not load instruction 220 misses data cache 61. Alternatively, at step 320 a store instruction 222 is executed. It does not matter whether or not store instruction 222 misses data cache 61.

At step 322, the address that has been locked is unlocked by the deassertion of a LOCK# signal.

At step 324, external interrupts are enabled.

In short, FIG. 6B sets forth the steps for ending an interlocked sequence. Bus lock bit 121 is cleared to a logical zero in dirbase 104. The next load or store instruction unlocks the locked address.

FIGS. 7A, 7B, 7C, and 7D, set forth the operation steps when a trap occurs after a lock instruction and before the load or store that follows the corresponding unlock instruction. At step 362, lock instruction 201 is fetched from external memory 86 or instruction cache 63 and decoded. At step 364, bus lock bit 121 is set to a logical one in directory base register 104.

At step 366, external interrupts are disabled.

At step 366, instructions are executed other than a load instruction or a store instruction that misses data cache 61.

At step 370, load instruction 220 is executed and misses data cache 61. Load instruction 220 accesses a location specified by an address.

Alternatively, at step 370, store instruction 222 is executed and misses data cache 61. Store instruction 222 accesses a location specified by an address.

At step 372, the address is locked by the assertion of a LOCK# signal.

At step 378, a trap occurs due to the execution of instruction 301 at step 376. Traps are caused by interrupts or by exceptional conditions (also referred to as "exceptions") detected in programs. Traps cause the interruption of normal program flow so that a special program known as a trap handler can be executed. Examples of exceptions include overflows, underflows, and inexact results. Types of traps include an instruction fault, a floating-point fault, an instruction access fault, a data access fault, an interrupt, and a reset. If a trap occurs, instruction execution is stopped and trap handler is executed.

In FIG. 7B, following the occurrence of the trap in step 378, at step 380 bus lock bit 121 is cleared to a logical zero in directory base register 104.

At step 386, interlock bit IL 138 in extended processor register 100 is set to a logical one. The setting of IL bit 138 to a logical one indicates to the trap handler that a locked sequence has been interrupted.

At step 388 of FIG. 7C, an address is placed in the fault instruction register fir 106 in order to help locate the trapped instruction.

At step 390 processor 10 begins executing the trap handler by transferring execution to virtual address 0xFFFFFF00. Execution is in the single-instruction mode. The trap handler must examine the trap-type bits in the processor status register 98 (namely, IT bit 134, IN bit 163, IAT bit 162, DAT bit 160, and FT bit 159) and the extended processor status register 100 (namely, IL bit 138) to determine the cause or causes of the trap. Thus, at step 394 of FIG. 7C, the trap handler examines interlock bit 138 in the extended processor register 100.

Step 398 determines where to resume upon returning from the trap handler. At step 398, when the trap handler finds that interlock bit 138 is set to a logical one, the trap handler then scans backwards to lock instruction 201 and restarts-at that point. Therefore, at step 400 of FIG. 7D, lock instruction 201 is read.

At step 402, bus lock bit in directory base register is set to a logical one. At step 404, the external interrupts are disabled.

At step 406, instructions other than a load or store instruction that misses data cache 61 are executed.

At step 408, load instruction 220 is executed and load instruction 220 misses data cache 61. Load instruction 220 accesses an address.

Alternatively, store instruction 222 is read at step 406, and store instruction 222 misses data cache 61. Store instruction 222 accesses an address.

At step 410, the address accessed by load instruction 220 or store instruction 222 is locked by the assertion of a LOCK# signal.

At step 412, the next sequential instructions are read and executed. As discussed above, the trap with respect to instruction 301 has already been handled.

In short, if a trap occurs after a lock instruction and before the load or store instruction that follows the corresponding unlock instruction, the processor 10 clears the bus lock bit to a logical zero and sets the interlock bit of the extended processor register. Thus, the sequence must be restartable from the lock instruction in case a trap occurs.

FIGS. 8A, 8B, 8C, and 8D illustrate the steps taken when processor 10 does not encounter a load or store following an unlock instruction by the time the processor has executed 32 instructions. If, following a lock instruction, processor 10 does not encounter a load or store following an unlock instruction by the time the processor has executed 32 instructions, the processor triggers an instruction fault on the thirty-second instruction. In such a case, the trap handler will find both interlock bit 138 and instruction trap bit 134 set to a logical one. Thus, branching outside of 32 sequential instructions following the lock instruction should be avoided, if possible.

In FIG. 8A, at step 442, lock instruction 201 is fetched from external memory 86 or instruction cache 63 and decoded.

At step 444, bus lock bit 121 is set in directory base register 104.

At step 446, external interrupts are disabled.

At step 448, instructions other than a load or store instruction that misses data cache 61 are executed.

At step 450, load instruction 220 that misses data cache 61 is executed. Load instruction 220 accesses an address. Alternatively, at step 450 store instruction 222 that misses data cache 61 is executed. Store instruction 222 accesses an address.

At step 452, the address is locked by the assertion of a LOCK# signal.

In FIG. 8B at step 454, the next 30 instructions are read and executed. At step 456, the next instruction—namely, instruction Z—is read.

At step 458, if instruction Z is a load or store instruction following an unlock instruction, then the next step is step 494 of FIG. 8D, which is a step where the next sequential instructions are read and executed.

If, however, instruction Z is not a load or store instruction following an unlock instruction, then the next step is step 460 of FIG. 8B. At step 460, instruction trap bit 134 in processor status register 198 is set to a logical one and an instruction fault trap is triggered.

At step 462, bus lock bit 121 is cleared in directory base register 104.

At step 468, interlock bit 138 is set to a logical one in extended processor status register 100.

At step 470 of FIG. 8C, an address is placed in fault instruction register 106 in order to help locate the trapped instruction.

At step 472, the processor 10 transfers execution to virtual address 0xFFFFFF00 and execution of the trap handler begins.

At step 476 the trap handler examines interlock bit 138.

At step 480, when the trap handler finds IL bit 138 set to a logical one, the trap handler scans backwards for lock instruction 201 and restarts at that point.

Therefore, at step 482 shown in FIG. 8D, Block instruction 201 is read. At step 484, bus lock bit 121 in dirbase 104 is set to a logical one.

At step 486, external interrupts are disabled.

At step 488, instructions other than a load or store instruction that misses data cache 61 are read and executed.

At step 490, load instruction 220 is executed and misses data cache 61. Load instruction 220 accesses an address.

Alternatively, at step 488 store instruction 222 is read at step 490 and misses data cache 61. Store instruction 222 accesses an address.

At step 492, the address is locked by the assertion of a LOCK# signal.

At step 494, the next sequential instructions are read and executed.

FIGS. 9, 10, and 11 are examples of how the lock and unlock instructions can be used in variety of interlocked operations. FIG. 9 illustrates a locked test and set operation. In FIG. 9, the value to be put in a semaphore is in register r23 of integer registers 94 of FIG. 2.

At step 522 of FIG. 9, a lock instruction is read and executed. At step 524, a "load from control register" instruction ld.b is read and executed. At step 524, the current value of the semaphore is placed in register r22 of integer registers 94 of FIG. 2.

At step 526, an unlock instruction is read and executed.

At step 528, a "store to control register" instruction st.b is read and executed. Instruction st.b of step 528 places the value of register r23 of integer registers 94 into the semaphore.

FIG. 10 illustrates locked "load/arithmetic logic unit ('ALU')-store" operations. At step 542, a lock instruction is read and executed.

At step 544, a "load integer" instruction ld.l is read and executed. At step 544, the value in a word memory location is stored in register r22 of integer registers 94 of FIG. 2.

At step 546 of FIG. 10, an "add unsigned" instruction addu is read and executed. At step 546 the contents of register I and register r22 of integer register 194 are added together and result placed in register r22 of integer registers 94. Overflow flag bit 172 of extended processor status register 100 gets bit 31 carry, and condition code bit 167 of processor status register 98 gets bit 31 carry also.

In alternative embodiments of the present invention, step 546 could be any ALU operation.

At step 548, an unlock instruction is read and executed.

At step 550, a "store integer" instruction st.l is read and executed. At step 550, the contents of register r22 of integer registers 94 is placed in a memory location defined by "word."

FIG. 11 illustrates the steps for a locked "compare and swap" operation. The locked compare and swap operation swaps the contents of register r23 of integer registers 94 with a word in memory if the contents of the word are the same as the contents of register 21 of integer registers 94.

At step 572, a lock instruction is read and executed.

At step 574, a "load integer" instruction ld.l is read and executed. At step 574, the content of the "word" location in external memory 86 is placed in register r22 of integer registers 94.

At step 576, a "branch if equal" instruction bte is read and executed. At step 576, if the contents of register r22 equal the contents of register r21, then execution branches to step 580 of FIG. 11. If, however, the contents of register r22 do not equal the contents of register r21, then execution continues at step 578. At step 578, a register to register move instruction is read and executed. At step 578, the contents of register r22 are moved to the contents of register r23.

At step 580, an unlock instruction is read and executed.

At step 582, a "store integer" instruction st.l is read and executed. At step 582, the contents of register r23 are stored in a location of external memory 86 defined by "word."

In foregoing specification, the invention has been described with reference to specific exemplary embodiments thereof. It will, however, be evident that various modifications and changes may be made thereto without departing from the broader and spirit and scope of the invention as set forth in the appended claims. The specification and drawings are, accordingly, to be regarded in an illustrative rather than a restrictive sense.

What is claimed is:

1. In a first computer processor connected through a bus to a memory resource, a second processor, and an address control means for controlling access to addresses accessed through the bus, said first computer processor executing a program task defined by a series of microinstructions including a lock instruction and an unlock instruction, a method for locking a memory address accessible through the bus and for unlocking the memory address, comprising the steps of:

(a) supplying the lock instruction from the program to the first computer processor;
  (b) executing the lock instruction in the first computer processor, including assigning a first value to a lock flag in a register in the first computer processor, but not actually locking an address;
  (c) supplying the next instruction from the program to the first computer processor;
  (d) if said next instruction in step (c) does not request a memory access, then executing said next instruction and repeating said step (c) to supply a next following instruction;
  (e) if said next instruction in step (c) does request a memory access to a requested address, then executing said next instruction, locking the requested address by asserting a lock signal from the first computer processor to the address control means such that the requested address can be accessed only by said first computer processor, and then repeating said step (c) to supply a next following instruction;
  (f) if a next instruction in said step (c) is an unlock instruction subsequent to locking a requested address in said step (e), then executing said unlock instruction, including assigning a second value to the lock flag so that the requested address is unlocked by asserting the lock signal upon the next following instruction supplied from the program that requests a memory access.

2. The method of claim 1 for locking and unlocking a computer address, wherein:
  in said step (b), executing the lock instruction includes disabling external interrupts generated from sources external to the program; and
  said step (f) includes enabling said external interrupts upon executing said unlock instruction.

3. The method of claim 1 for locking and unlocking a computer address, wherein the first value is a logical one and the second value is a logical zero.

4. The method of claim 1, wherein if a trap condition occurs following said step (b) but before unlocking the address, then the method further comprises the steps of:
  (g) assigning a second value to the lock flag to indicate that locking is not requested;
  (h) storing in a fault instruction register an address of the instruction that caused the trap condition;
  (i) executing a trap handler routine that reads the address of the instruction that caused the trap condition and handles the trap condition;
  (j) scanning backward through the series of microinstructions to the lock instruction previously executed in said step (b); and
  (k) repeated said steps (b) through (f).

5. The method of claim 4 for locking and unlocking a computer address wherein:
  in said step (b), executing the lock instruction includes disabling external interrupts;
  said step (f) includes enabling said external interrupts; and
  said step (g) includes enabling said external interrupts.

6. The method of claim 4 for locking a computer address, wherein the first value is a logical one.

7. The method of claim 1 for locking and unlocking a computer address, further comprising a step (g) of:
  (g) if the step (c) is repeated more than N times following assigning a first value to the lock flag wherein N is a non-zero positive integer, and if a memory access has not been requested in step (e) so that no address has been locked, and if an unlock instruction has not been executed in the step (g), then a second value is assigned to the lock flag indicating that locking is no longer requested.

8. The method of claim 7, wherein N is in an approximate range between twenty-five and thirty-five.

9. The method of claim 1, further comprising a step (g) of:
  (g) if the step (c) is repeated more than N times following assigning a first value to the lock flag wherein N is a non-zero positive integer, and if a requested address has been locked in step (e) without unlocking in said step (f), then unlocking the requested address.

10. The method of claim 9, wherein N is in an approximate range between twenty-five and thirty-five.

11. The method of claim 1, wherein said step (f) includes the sub-steps of:
  (f)(1) assigning a second value to the lock flag to indicate that unlocking has been requested;
  (f)(2) supplying and executing a next instruction in the series of instructions;
  (f)(3) if said next instruction does not request a memory access, then repeating said step (f)(2) to supply and execute a next following instruction;
  (f)(4) if said next instruction requests a memory access, then unlocking the requested address locked in the step (e) so that said address can be accessed by another task.

12. The method of claim 11 for locking and unlocking a computer address, wherein:
  in said step (b), executing the lock instruction includes disabling external interrupts generated from a source external to the program; and
  said step (f) includes a sub-step (f)(5) of enabling said external interrupts.

13. In a first computer processor connected through a bus to an external memory, a second processor, and an address locking means for locking an address, a method for executing a program including a series of instructions, said instructions including an interlocked operation defined by instructions between a lock instruction and an unlock instruction, said interlocked instructions including an instruction that accesses the external memory, said method comprising the steps of:

(a) supplying the lock instruction from the program to the first computer processor;

(b) executing the lock instruction in the first computer processor, including assigning a first value to a lock flag in the first computer processor and disabling external interrupts generated from sources external to the program, but not locking an address;

(c) supplying the next instruction in the interlocked series of instructions to the first computer processor;

(d) if in said step (c) said next instruction does not request a memory access and is not an unlock instruction, then executing said next instruction and repeating said step (c) to supply a next following instruction;

(e) if in said step (c) said next instruction does request a memory access to a requested address, then asserting a lock signal from said first computer processor for locking the requested address such that the requested address can be accessed only by the task that requested the memory access, and then repeating said step (c) to supply a next following instruction;

(f) if in said step (c) said next instruction is an unlock instruction, the executing said unlock instruction, including assigning a second value to the lock flag to indicate that unlocking has been requested, but not actually unlocking said requested address; and (g) following execution of the unlock instruction in the step (f), supplying a next instruction to the first computer processor, and if said next instruction requests a memory access, then enabling said external interrupts and de-asserting the lock signal to unlock the requested address.

14. The method of claim 13, further comprising a step (g) of:

(g) if the step (c) is repeated more than N times following assigning a first value to the lock flag wherein N is a non-zero positive integer, and if a memory access has not been requested in step (e) so that no address has been locked, and if an unlock instruction has not been executed in the step (g), then a second value is assigned to the lock flag indicating that locking is no longer requested.

15. The method of claim 14, wherein N is in an approximate range between twenty-five and thirty-five.

16. The method of claim 14, further comprising a step (h) of:

(h) if the step (c) is repeated more than N times following assigning a first value to the lock flag wherein N is a non-zero positive integer, and if a requested address has been locked in step (e) without unlocking in said step (g), then unlocking the requested address.

17. The method of claim 16, wherein N is in an approximate range between twenty-five and thirty-five.

18. The method of claim 13, wherein if a trap condition occurs following said step (b) but before unlocking the address, then the method further comprises the steps of:

(h) assigning a second value to the lock flag to indicate that locking is not requested;

(i) storing in a fault instruction register an address of the instruction that caused the trap condition;

(j) clearing the lock signal so that the locked address is unlocked;

(k) executing a trap handler routine that reads the address of the instruction that caused the trap condition and handles the trap condition;

(l) scanning backward through the series of microinstructions to the lock instruction previously executed in said step (b), and (m) repeating said steps (b) through (f).

19. In a first computer processor connected through a bus to an external memory a second processor, and a address locking means for locking an address, a method for executing a program in the first computer processor, said program including a series of instructions said instructions including an interlocked operation defined by instructions between a lock instruction and an unlock instruction, said interlocked instructions including an instruction that accesses the external memory, said method comprising the steps of:

(a) supplying the lock instruction from the program to the first computer processor;

(b) executing the lock instruction in the first computer processor, including assigning a first value to a lock flag in a register in the first computer processor, and disabling external interrupts generated from sources external to the program, but not locking an address;

(c) supplying the next instruction in the interlocked series of instructions to the first computer processor;

(d) if in said step (c) said next instruction does not request a memory access and is not an unlock instruction, then executing said next instruction and repeating said step (c) to supply a next following instruction;

(e) if in said step (c) said next instruction does request a memory access to a requested address, then asserting a lock signal from the first computer processor for locking the requested address such that the requested address can be accessed only by the task that requested the memory access, and then repeating said step (c) to supply a next following instruction;

(f) if in said step (c) said next instruction is an unlock instruction, then performing the steps of:

(f)(1) assigning a second value to the lock flag to indicate that unlocking has been requested, but not actually unlocking said requested address, and enabling said external interrupts, (f)(2) supplying and executing a next instruction in the series of instructions, (f)(3) if said next instruction does not request a memory access, then repeating said step (f)(2) to supply and execute a next following instruction, and (f)(4) if said next instruction requests a memory access, then deasserting the lock signal to unlock the requested address locked in the step (e);

(g) if the step (c) is repeated more than N times following assigning a first value to the lock flag wherein N is a non-zero positive integer, and if a memory access has not been requested in step (e) so that no address has been locked, and if an unlock instruction has not been executed in the step (g), then repeating said sub-steps (f)(1)–(f)(4); and (h) if the step (c) is repeated more than N times following assigning a first value to the lock flag wherein N is a non-zero positive integer, and if a requested address has been locked in step (e) without unlocking in said step (f), then repeating said sub-steps (f)(1)–(f)(4).

20. The method of claim 19, wherein N is in an approximate range between twenty-five and thirty-five.

21. The method of claim 19, wherein if a trap condition occurs following said step (b) but before unlocking the address, then the method further comprises the steps of:

(i) assigning a second value to the lock flag to indicate that locking is not requested;

(j) storing in a fault instruction register an address of the instruction that caused the trap condition;

(k) clearing the lock signal so that the locked address is unlocked;

(l) executing a trap handler routine that reads the address of the instruction that caused the trap condition and handles the trap condition;

(m) scanning backward through the series of microinstructions to the lock instruction previously executed in said step (b), and (n) repeating said steps (b) through (g).

* * * * *